(12) United States Patent
Rapaport et al.

(10) Patent No.: US 9,954,841 B2
(45) Date of Patent: *Apr. 24, 2018

(54) DISTINGUISH VALID USERS FROM BOTS, OCRS AND THIRD PARTY SOLVERS WHEN PRESENTING CAPTCHA

(71) Applicant: Fireblade Holdings, LLC, Dallas, TX (US)

(72) Inventors: Shay Rapaport, Kfar Saba (IL); Erez Azaria, Gedera (IL); Omri Schwartz, Elyahin (IL)

(73) Assignee: FIREBLADE HOLDINGS, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/292,723

(22) Filed: Oct. 13, 2016

(65) Prior Publication Data
US 2017/0034148 A1   Feb. 2, 2017

Related U.S. Application Data

(63) Continuation of application No. 13/984,647, filed as application No. PCT/IB2012/050551 on Feb. 7, 2012, now Pat. No. 9,501,651.

(Continued)

(51) Int. Cl.
| | |
|---|---|
| *H04L 29/06* | (2006.01) |
| *G06F 21/31* | (2013.01) |
| *G06F 21/60* | (2013.01) |

(52) U.S. Cl.
CPC ............. *H04L 63/08* (2013.01); *G06F 21/31* (2013.01); *G06F 21/60* (2013.01); *H04L 63/126* (2013.01);

(Continued)

(58) Field of Classification Search
CPC .. G06F 21/31; G06F 2221/2133; G06F 21/60; H04L 2463/144; H04L 63/126; H04L 63/1441; H04L 63/08
See application file for complete search history.

(56) References Cited

U.S. PATENT DOCUMENTS 7,577,994 B1 * 8/2009 Sobel ..................... G06F 21/31
  709/225
8,316,310 B2 * 11/2012 Champion ............ G06F 21/316
  709/203

(Continued)

FOREIGN PATENT DOCUMENTS

EP  2383954 A2  11/2011
WO  2010111169 A1  9/2010

(Continued)

*Primary Examiner* — Farid Homayounmehr
*Assistant Examiner* — Sanchit K Sarker
(74) *Attorney, Agent, or Firm* — Browdy and Neimark, PLLC

(57) ABSTRACT

A method and system of administering a CAPTCHA challenge comprising: providing a CAPTCHA challenge to the client computer, the CAPTCHA challenge comprising an image and browser code for displaying the image, the image comprising a character string in which a first sub string smaller than said character string corresponds to a solution to the CAPTCHA challenge and a second substring smaller than said character string corresponds to extra characters not part of the solution, displaying the image on the client computer wherein only the first substring is visible in the browser, receiving a response from the client computer, comparing the response with the second substring, and determining, if the response includes the second substring, that the client computer used a CAPTCHA bot or relay.

11 Claims, 4 Drawing Sheets

Related U.S. Application Data

(60) Provisional application No. 61/472,114, filed on Apr. 5, 2011, provisional application No. 61/441,630, filed on Feb. 10, 2011.

(52) U.S. Cl.
CPC .. *G06F 2221/2133* (2013.01); *H04L 63/1441* (2013.01); *H04L 2463/144* (2013.01)

(56) References Cited

U.S. PATENT DOCUMENTS

| | | | |
|---|---|---|---|
| 9,275,215 B2* | 3/2016 | Bailey | G06F 21/36 |
| 9,501,651 B2* | 11/2016 | Rapaport | G06F 21/31 |
| 9,680,850 B2* | 6/2017 | Rapaport | H04L 63/1416 |
| 2005/0144134 A1* | 6/2005 | Hirano | H04H 20/82 |
| | | | 705/51 |
| 2006/0136249 A1 | 6/2006 | Kagan et al. | |
| 2006/0019056 A1 | 8/2006 | Conboy et al. | |
| 2007/0255821 A1 | 11/2007 | Ge et al. | |
| 2007/0260520 A1 | 11/2007 | Jha et al. | |
| 2008/0147673 A1 | 6/2008 | Candea et al. | |
| 2008/0301808 A1 | 12/2008 | Calo et al. | |
| 2009/0113294 A1* | 4/2009 | Sanghavi | G06F 17/211 |
| | | | 715/269 |
| 2009/1113294 | 4/2009 | Sanghavi Mehul | |
| 2009/0241174 A1 | 9/2009 | Rajan et al. | |
| 2009/0328163 A1* | 12/2009 | Preece | G06F 21/36 |
| | | | 726/5 |
| 2010/0031315 A1* | 2/2010 | Feng | G06F 21/554 |
| | | | 726/3 |
| 2010/0125668 A1 | 5/2010 | Bocchieri et al. | |
| 2010/0250397 A1 | 9/2010 | Ippolito | |
| 2010/0287229 A1* | 11/2010 | Hauser | G06F 21/316 |
| | | | 709/203 |
| 2011/0173178 A1 | 7/2011 | Conboy et al. | |
| 2011/0270969 A1* | 11/2011 | Noh | H04L 63/1458 |
| | | | 709/224 |
| 2011/0271349 A1* | 11/2011 | Kaplan | H04L 51/12 |
| | | | 726/26 |
| 2012/0066586 A1* | 3/2012 | Shemesh | G06F 17/30902 |
| | | | 715/235 |
| 2012/0090030 A1* | 4/2012 | Rapaport | H04L 63/1441 |
| | | | 726/23 |
| 2012/0222100 A1* | 8/2012 | Fisk | G06F 21/316 |
| | | | 726/7 |
| 2013/0104217 A1* | 4/2013 | Kruger | G06F 21/36 |
| | | | 726/7 |
| 2014/0250538 A1* | 9/2014 | Rapaport | G06F 21/31 |
| | | | 726/28 |

FOREIGN PATENT DOCUMENTS

| | | |
|---|---|---|
| WO | 2010143152 A2 | 12/2010 |
| WO | 2013168158 A1 | 11/2013 |

* cited by examiner

DISTINGUISH VALID USERS FROM BOTS, OCRS AND THIRD PARTY SOLVERS WHEN PRESENTING CAPTCHA

CROSS-REFERENCE TO RELATED APPLICATIONS

This is a continuation of U.S. application Ser. No. 13/984, 647, filed Mar. 27, 2014, which is a § 371 National Stage of PCT/IB12/50551, filed Feb. 7, 2012, which claims the benefit of U.S. Provisional Application No. 61/441,630, filed Feb. 10, 2011, and U.S. Provisional Application No. 61/472, 114, filed Apr. 5, 2011, all of which are hereby incorporated herein by reference in their entirety.

TECHNICAL FIELD

The present invention relates to CAPTCHA challenges meant to prevent robotic internet browsing and form submissions and, in particular to ways of detecting common means used to break CAPTCHA challenges.

BACKGROUND

CAPTCHAs are computer generated tests which, in most circumstances, a computer system will fail to pass, and are easily solved by humans. The typical implementation is a computer generated image of characters and digits which may be distorted and contain some visual background "noise." The user is asked to type the string being displayed on the image, the procedure assuming that humans can read these images while computers can't. These tests are meant to validate the presence of a human end-user in interactions taking place over a computer network.

On the Internet it has become a common practice to use automation tools, known as "bots", to conduct repetitive tasks and abuse web applications. Repetitive tasks can include form submissions and repetitious page requests, and are designed to create user accounts, to log-in to accounts, to submit content on web forms, to collect data from websites and generally to abuse platforms and system resources. These activities create commercial value to those conducting them, while in many aspects they badly disrupt the systems and the businesses which they abuse. CAPTCHAS were developed to prevent these abuses, by establishing if the end-user is a human or a machine. They have become the common practice web sites use to prevent automated abuse, such as spam and more.

However, since CAPTCHAs are so common, they are targeted by spammers, companies and individuals who wish to break or bypass CAPTCHAs, so as to conduct their misdeeds. There are two known ways to break or bypass a CAPTCHA challenge. The first is by using an advanced Optical Character Recognition (OCR) system. OCRs can be programmed to identify the distorted characters which are used on certain CAPTCHAs. An automated script ("bot") utilizing an OCR will let the OCR decipher the CAPTCHA and then fill-in the string at the web form, where the CAPTCHA value should be typed.

The second method is by relaying the CAPTCHA to a third party human solver. A third party means an entity which is not the client interacting with the web server. Commercial CAPTCHA solving companies (known as "CAPTCHA farms") charge as little as $0.50 for solving 1,000 CAPTCHAs. When a bot comes across a CAPTCHA, it will typically get the CAPTCHA image and send it to the CAPTCHA farm (sometimes through an application programming interface), where a human solver will decipher the image, sending the result string back to the bot, to fill in and pass the test. In some cases, high traffic sites, such as software serial numbers indexes and adult content, are used to attract innocent users, who are asked to solve a CAPTCHA to get the content they were looking for. The CAPTCHA is actually relayed from a bot abusing another platform, getting helped by these users.

Typically, websites which notice automated activity breaking their CAPTCHAs will change to another variant of CAPTCHA. This will bar OCRs, at least for a while, because they depend on the visual characteristics of the CAPTCHA in order to solve it. However, this will not help against 3rd party human solvers, since they are indifferent to the CAPTCHA type: as long as a human user can solve it, they can. This also suggests why CAPTCHA farms are becoming more and more popular, despite the fact they cost money, and why OCRs are becoming less favorable for spammers.

Wishing to prevent OCR-based CAPTCHA breaking, CAPTCHA challenges have become more and more difficult. Characters are typically blurred, skewed and override each other in many cases. Ultimately, many CAPTCHAs have become too difficult even for humans. They disrupt user experience and in some cases even scare users away. These difficult CAPTCHAs, resistant to OCRs, fail to stop third party human solving (i.e., a relay) and are thus comprised and get broken, for a very low cost, by spammers.

GENERAL DESCRIPTION

Exemplary embodiments of the present technique disclose a method and systems for providing an automated public Turing test to a client display system. The method includes providing an image having a plurality of random characters, as well as providing a browser code to the client, whereby the browser code is adapted to restrict display of the image to only a predetermined portion of the image. The method further includes detecting a client response to receiving the predetermined portion of said image.

Other exemplary embodiments of the present technique further include a method of selectively challenging a user with an automated public Turing test to a user in response to a communication from the user. The method includes checking for the existence of a user identifier. The method further includes verifying that the returned user identifier is not a stolen identifier if the user identifier is returned. If the user identifier is not returned, then the method assigns a user identifier to the user. Further, the method includes presenting the automated public Turing test to the user unless a predetermined criterion is met. In addition, the method includes obtaining and storing an analysis of the response of the user to the automated public Turing test.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION

Figure 1:
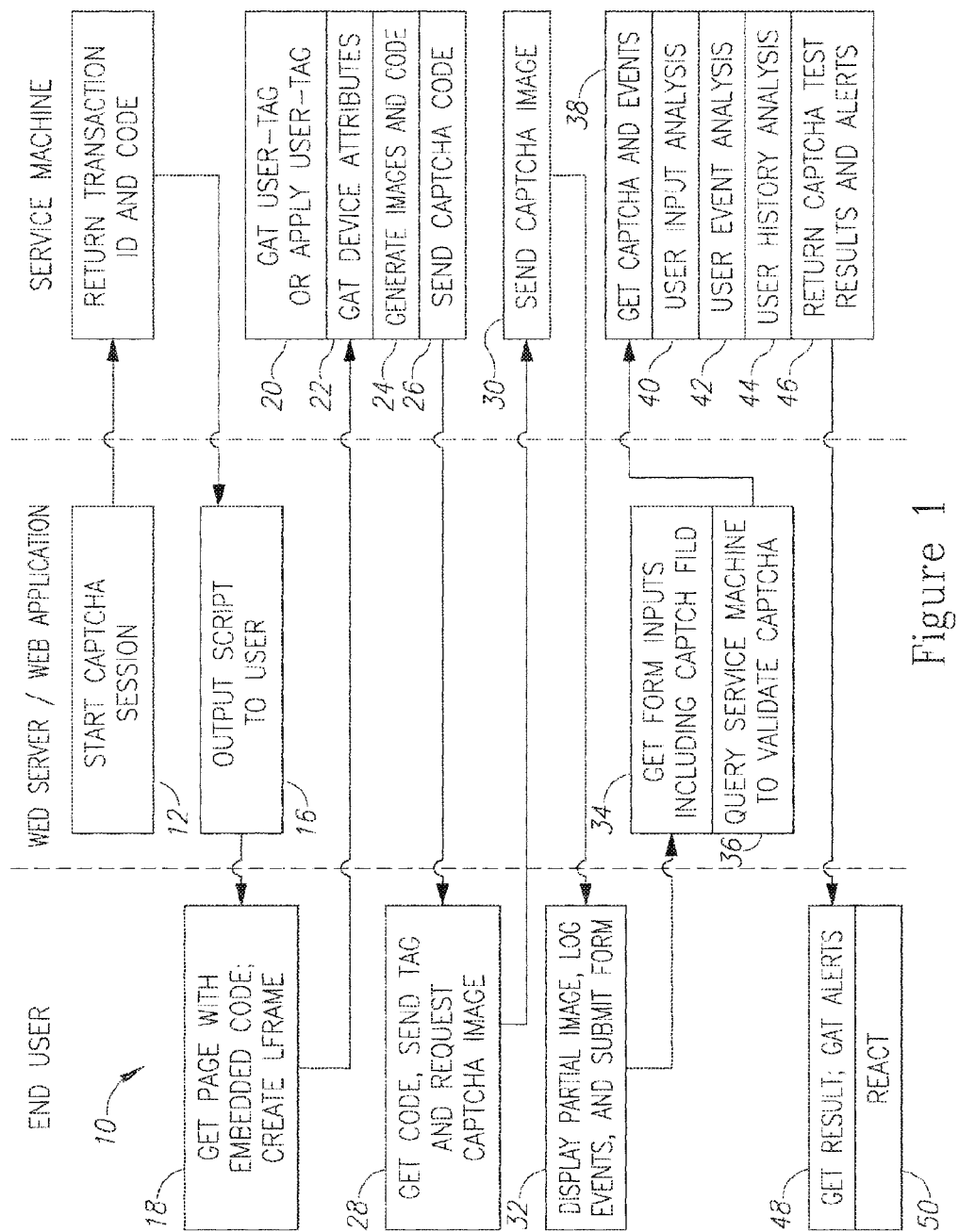
FIG. 1 is a flow diagram illustrating the functional interactions between an end user, a web server, and a Server dedicated to the provision of the CAPTCHA service, in accordance with an aspect of the present technique.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a flow diagram 10 illustrating general operation of the disclosed methods described in greater detail below, the flow diagram 10 providing an overview of the functional interactions between an end user, a web server, and a Server dedicated to the provision of the CAPTCHA service (hereinafter "Service Machine"), the system components functioning in accordance with the present invention.

A CAPTCHA session is started at the web server or web application, at step 12. The Service Machine returns a transaction ID and a code to the web server or web application, at step 14. The web server or web application outputs script to the user, at step 16. The end user receives the script, at step 18, and gets a page with an embedded code, and creates an Iframe. The Service Machine receives a transmission from the end user and gets a user tag or applies a user tag, at step 20. The Service Machine also gets the attributes of the user device, at step 22, and generates images and code, at step 24.

At step 26, the Service Machine sends the CAPTCHA code to the end user. The end user obtains the CAPTCHA code, at step 28, sends a tag, and requests a CAPTCHA image. The Service Machine receives the user request and sends the CAPTCHA image to the end user, at step 30. The end user device displays a partial image, logs events, and submits the form to the web server or web application, at step 32. The web server or web application obtains the form inputs, including the CAPTCHA fields, at step 34. The web server or web application then queries the Service Machine to validate the CAPTCHA, at step 36.

The Service Machine obtains the CAPTCHA and the user device events, at step 38. The Service Machine then generates a user input analysis, at step 40, a user device event analysis, at step 42, and a user device history analysis, at step 44. The resulting CAPTCHA test results and alerts are returned to the end user device by the Service Machine, at step 46. The end user device receives the CAPTCHA test results and alerts from the Service Machine, at step 48, and reacts accordingly, at step 50, as described in greater detail below.

In an exemplary embodiment of the present invention, an image comprising a random string, converted into bitmap, may be generated by a server, being either the web-server serving the site being browsed, or a server dedicated to the provision of the Service Machine. The image can be animated, such as by using animated GIF, in order to "harden" the deciphering of the string with an OCR. An animation can be, without limitation, (i) a thick vertical line of pixels circling horizontally on the text string, so that at each given minute at least one character will be at least partly hidden behind the circling pixels, or (ii) a horizontal line circling up and down the image to hide a portion of all the characters at any given time.

In an exemplary embodiment, only a predetermined part of the CAPTCHA image generated by the Service machine will be displayed to the end user. For this purpose, the Service Machine will first decide, randomly, which part of the full image is to be displayed (e.g., characters 4-9 out of a 12-character CAPTCHA image). The Service Machine will calculate the amount of pixels that need to be hidden on both edges of the full CAPTCHA image, and store all the values generated, including: (i) the full CAPTCHA string, (ii) the partial string to be displayed, and (iii) the number of pixels that need to be hidden on both sides of the full CAPTCHA image.

In an exemplary embodiment, for the purpose of calculating the width of the parts of the full CAPTCHA image that need to be hidden, a method may function to create both the full CAPTCHA image and create an image or images of the parts of the full string that are not intended for display. For example, if the full string is "abcdefgh12345" and only the string "fgh123" is intended to be displayed to the end-user, the server will create one image of "abcdefgh123" and then two temporal images, one image of the string "abcde" and one image of "45", using the same font type and size. The latter two images will be used to measure their width, which can be easily queried after they are produced, and store the values of the number of pixels to be hidden on each side of the full image.

In an exemplary embodiment, for the purpose of hiding parts of the full CAPTCHA and displaying only the selected characters, the Service Machine generates a client side code (typically HTML, Javascript and CSS), which will be served to the end client's browser and encapsulate the image. The number of pixels to be hidden on both edges may be passed to this script, as a numeric value or as a function or numerous functions generating this value. The script, when rendered on a web browser, will display the image, but hide the characters that are not meant to be displayed. Such script can, without wishing to be limited, generate an iFrame tag, with attributes that make it shorter in length than the image created for the challenge. The image can be presented in the frame, and can be indented to the right or to the left by the pre-calculated number of pixels which will make exactly the desired part visible. For example and without wishing to be limited, indenting the image to the right or to the left can be done with style attributes, such as CSS "left" or "right" attributes, or by adding other generated images with the pre-calculated width to the left or to the right of the full CAPTCHA image.

In another exemplary embodiment, when the user submits the CAPTCHA, the user-inputs will be transferred to the Service machine, either directly or indirectly (such as by a web-service call containing a transaction ID). The Service Machine will perform a User-Input Analysis which is intended to conclude if the CAPTCHA was typed correctly and if there is an indication of relay or automation fraud. The User-Input Analysis result can be stored finally as a single value, or two separate values—one value indicating the string match analysis and one value indicating if a fraud has been detected in filling the CAPTCHA. For clarity of explanation, when two such separate values are used, the first value is identified by the label stringMatch and the second value is identified by the label fraudDetected.

Figure 2:
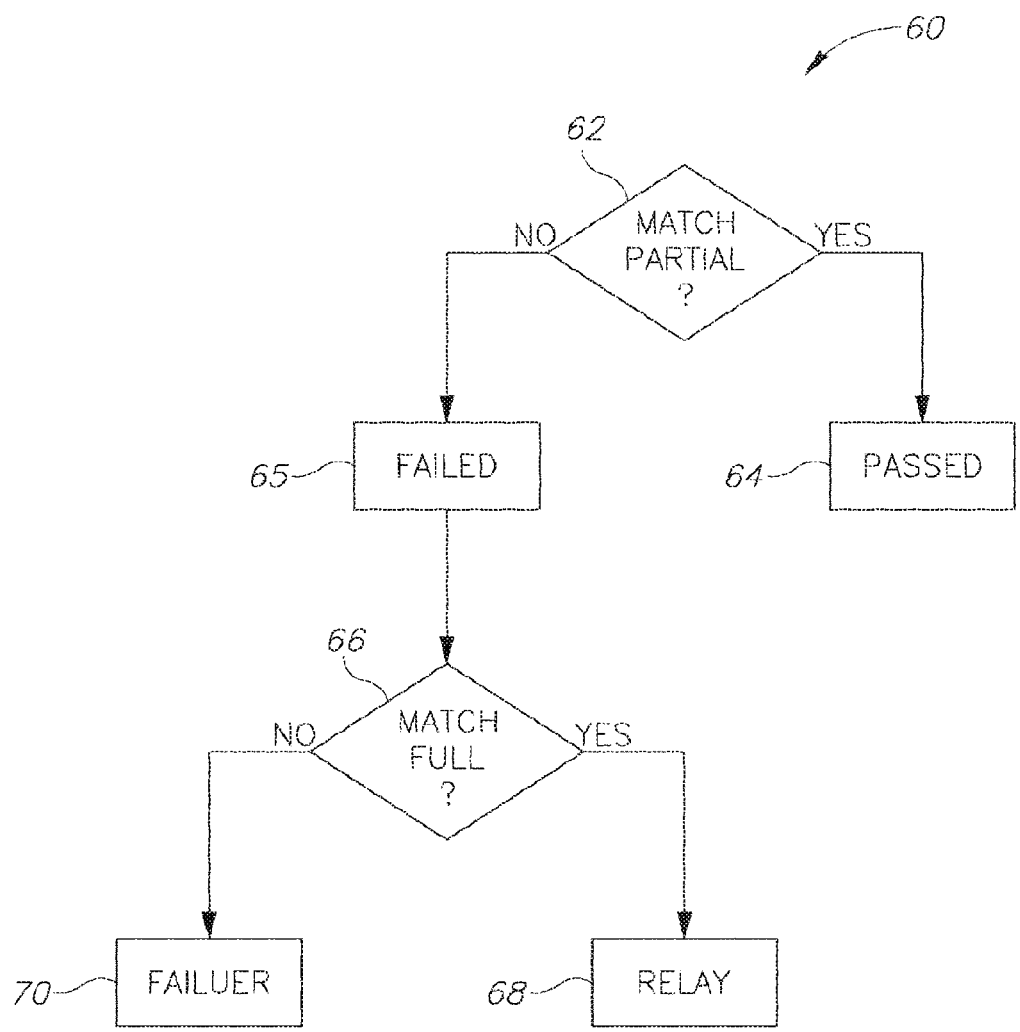
FIG. 2 is a flow diagram of a CAPTCHA Analysis Rule Set, in accordance with an aspect of the present invention.

To perform the User-Input Analysis, the Service Machine may compare the user-input string both to the partial string that was intended to be displayed and to the full one generated for the current CAPTCHA transaction, in accordance with a Rule Set for Decision Making, the Rule Set functioning in accordance with a flow diagram 60, shown in FIG. 2. If the user-input string matches the partial string, at decision block 62, it means the user typed the visible part of the full CAPTCHA image and passed the test correctly. In such case the stringMatch value would be set to "Passed," at step 64. If the string does not match any of the stored strings, that is, neither a full stored string nor a partial one stored string generated for this transaction, it means the user failed the CAPTCHA test and the stringMatch value will be set to "Failed," at block 65 and the process moves to decision block 66. If, at decision block 66, the user-input string matches the full string (comprising the whole image, including the hidden characters) this means that a relay process took place, at step 68, since the user was not supposed to see the hidden parts of the full CAPTCHA image. This indicates that the whole image was transmitted to a third party machine, where a human user watched it without the layers covering portions of it, and therefore filled in the entire string. In such cases, the stringMatch value will remain "Failed," at step 70, and the fraud Detected value will be set from its default value "OK" to "Relay."

At the end of the User-Input Analysis, the Service Machine may store the result (Passed/Failed, Relay/OK) with the user data and transaction data. The Service Machine may response to the web application with the User-Input Analysis result, or conduct further analysis as further explained before storing the results and responding to the web application. In yet another exemplary embodiment, the present invention includes additional means to identify cases of relay. Since client-side scripts such as HTML/CSS/Javascript are used to cover parts of the image, spammers may try to transmit the entire relevant code with the image to a third party human solver, to establish a situation in which the same part of the image are hidden or shown on the solver's screen.

If an iFrame is used to display the CAPTCHA, a Javascript can be embedded inside the iFrame document, to detect the presence of an iFrame and a parenting document, and/or to examine the iFrame size and make sure it is same size as originally inserted into the code, and/or to query the URL of the iFrame and its parenting document and see if both appear on the correct web application's URLs, or to open yet another document frame and attempt to query it via client-side script, to make sure cross-scripting is allowed and establish that the CAPTCHA and web application are displayed on the same domain. Incorrect URLs, a lack of iFrame, incorrect parent/child document relations or inability to reach another URL on the web application domain via script, may indicate relay. In case of such relay, the fraudDetected value will be set from its default value "OK" to "Relay".

In still another exemplary embodiment, the present invention may include more means to detect relay. The web application may include a code that will check the user IP addresses during their sessions and send them to the Service Machine in the beginning of a CAPTCHA service session. The Service Machine can further compare the IP address or addresses to the one used to fill-in the CAPTCHA. If the page presenting the CAPTCHA is read from an IP address different than the one conducting the user session, and not within the same IP range or geo-location, or same organization ID (taken from IP 'whois' query), this is also an evidence of a relay process. In case of such Relay, the fraudDetected value will be set from its default value "OK" to "Relay."

In another exemplary embodiment, the present invention may include User-Event Analysis to detect automated or fraudulent attempts to submit data and break the CAPTCHA. For the purpose of collecting data for the User-Event Analysis, the client-side code may include event listeners, that will test if the user: (i) actually focused on the CAPTCHA text field or other form fields ("onFocus" event in Javascript), (ii) if there was either a mouse click, a mouse move or a keystroke to move between fields, and (iii) if there were correlating keystroke events used to type in the data and if there was a mouse or a keyboard event used to submit the form. The event listeners will log the mouse and keyboard events and can store the log temporarily. Storing can be achieved, without wishing to be limited, either on the client-side as script variables, cookies or local storage, or alternatively on the web-server via Ajax.

Typically, but without wishing to be limited, the log will record any form event, such as: (i) form element focus or blur event, (ii) any field value change and the form submission event, and (iii) a list of keyboard and mouse events which took place before each such form event. The event log may be returned to the Service Machine for analysis when the form and CAPTCHA are submitted. The Service Machine may apply a User-Event Rule-Set to establish if the CAPTCHA text field or any other form fields have been filled in without the expected correlating mouse and/or keyboard events. Lack of the expected events may be evidence that an automated process and/or a relay process took place. In such automation cases, the fraudDetected value will be set from its default value "OK" to "Automation".

In another exemplary embodiment, the said User-Event Rule-Set can be configured to be satisfied if there have been keystrokes or mouse events, or alternatively, if there has been at least a keystroke or mouse event per each formfield focus, or each form-field blur, or each form-field value change, or any combination of these. Additionally, the User-Event Rule-Set can be set to test the separate keystrokes and match them to the values submitted in certain form fields.

In another exemplary embodiment, for the purpose of recording users' histories, the Service Machine may assign a unique user identity (hereinafter: "user-tag") to each user. The user-tag will be sent to the end-user in a script, that will store it on the user's machine, either as a browser cookie, or a Flash cookie (known also as "global storage"), or as a browser local storage value, or as a cached script file containing the tag as a value, or any combination of these methods. The Service Machine will also serve a script that will re-collect the usertags from the user's browser, if the user already has such user-tag. Any information collected in a CAPTCHA session may be recorded in a manner that allows for restoration of the data later based on the user-tag as a key.

In another exemplary embodiment, for the purpose of identifying users who try to avoid tagging by deletion of cookies and cache, and in order to enable the Service Machine to restore their histories, the Service Machine may collect from the end-users device and browser attributes, commonly known as "device fingerprints." Such fingerprints are collected by a combination of server-side and client-side code, as demonstrated on 'EFF.org' and 'browserspy.com.' The Service Machine will serve the code to the end-user browser and store the outputs needed.

These attributes may include, without wishing to be limited, the browser type, operation system type, screen resolution, available fonts, Javascript version and build, installed plugins, such as Flash and others and their versions, browser add-ons such as Adobe Acrobat, Skype and so on, time offset between the client's clock and the server clock, flash version, HTTP headers, TCP/IP stack, use of proxies, IP range and geo-location and others. The combination of these attributes can create a unique fingerprint, in varying accuracy levels, starting from one to a few tens of thousands, and going up to one in a few millions, as demonstrated on EFF.ORG website. These attributes will be stored, separately or as one string (such as a hashed value) alongside any freshly created user-tag, so whenever a user-tag is created and saved on user's machine, the user-tag is also stored on Service machine with these device attributes, in a manner that allows restoring the device attributes by user-tag and vice-versa.

In another exemplary embodiment, for the purpose of identifying a returning user, the Service Machine will establish first if the user-tag is newly created in the current session, or a veteran one that has been collected from the user. If the user-tag is veteran (meaning the user started the session with an existing tag), the Service Machine will search the tag in the database and, if found, will use this user-tag for storing any information about this session. It may also flag this user-tag as a "veteran tag", meaning this user had at least two or a greater number of sessions with the same tag (which indicates that this user does not tend to delete cookies and cache). If the user has no veteran user-tag or the collected tag could not be found in the database, the Service Machine may search the usertag by device attributes. The attributes collected by Service Machine in the current session may be compared either with all other device attributes previously stored, or alternatively just with tags which do not have a "veteran tag" flag, meaning that they are either new users or suspected as users who do delete cookies and browser cache—potentially in purpose to disguise their identities. If a match is found, the matched user-tag will be fetched and used for this session.

In another exemplary embodiment, for the purpose of recording users' histories, after creating or restoring a user-tag, any CAPTCHA session events may be stored with the user-tag in a manner that allows to restore the user history later by the user-tag. Such events can be the session starting time, the user's response time, the website details, the User-Input Analysis results and the Fraud Analysis results per session. In an exemplary embodiment, the Service Machine may conduct a User's History Analysis in cases of user tags collected from the user or found via device-attribute search. For the purpose of User History Analysis, the Service Machine will use the user-tag to restore all or recent session data of that user-tag. Recent sessions can be a limited number of last sessions (such as last 100 sessions) or all sessions during last minutes or hours. The Service machine, after collecting User History, will apply a History-Analysis Rule-Set to establish if this may be a potential spammer. The results of the User History Analysis will be sent to the web application with the User-Input Analysis.

In an exemplary embodiment, the User-History Rule-Set will establish that a user is a potential spammer if one or more of the following conditions are met: (i) if the user has more than a predefined CAPTCHA sessions per time limit (various time intervals can be checked, such as last minute, last 10 minutes etc.); ii if the user has more than a predefined number of Relay records, (iii) if the user has more than a predetermined number of Automation records, or (iv) if the user has surpassed a predetermined ratio threshold of Failed records compared to Passed ones.

In yet another exemplary embodiment, the Service Machine may be a dedicated machine or machines (either physical or virtual) set for the purpose of the Advanced CAPTCHA Service. The Service Machine may serve the client-side code directly to the end user (via iFrame), or indirectly, by passing parts or all of the code and images to the web application server, which will serve them to the end users, or send the code to the web-server, which will send it to its end-clients. Typically, but without wishing to be limited, the web-server will create a transaction ID, and ask the CAPTCHA server for the code, using the transaction ID (over HTTP/web-service).

In an exemplary embodiment, the Service Machine comprises a standalone machine, which communicates with both the web application and the end user. The web application calls the Server Machine (typically via webservice) when the CAPTCHA service is needed and gets a Transaction ID and client-side code to embed to a page, in order to display the Progressive CAPTCHA. The code contains the event listeners needed for any User-Event Analysis and a function which generates an Iframe in which the CAPTCHA image will be displayed, and a form field to which the CAPTCHA value will be typed. The Iframe source calls a URL on Service Machine, with the transaction ID embedded to the URL. The Service Machine, when it gets the call from the enduser's browser generates the CAPTCHA strings and CAPTCHA images and returns the code used to take device attributes from the user's browser, a code that calls and displays the CAPTCHA images with parts of it being hidden as described above, and the full CAPTCHA image. When the CAPTCHA is filled and form is submitted to the web application server, the web application will query the Service Machine about the Analysis results, typically via web-service containing the transaction ID at the request.

Other exemplary embodiments of the present technique include method adapted to detect a legitimate end-client, or browser, and remove the CAPTCHA challenge for such legitimate clients. However, if the method recognizes the client or browser to be an automation script or a spammer, the CAPTCHA challenge is not removed for such an end client.

In accordance with the present invention, (i) the code and all means used to decide whether a CAPTCHA challenge should be presented to an endclient, and (ii) all code and means needed to communicate with a web application and/or a CAPTCHA software or CAPTCHA service, may reside either on a Webserver on which a web site resides, or on any other server or device.

Preferably, the server or device functions to communicate with a website's end-client, either (i) directly (such as by an iFrame call from a document originating from the web-server), or (ii) indirectly (such as by communicating code or directions to the web application which serves code to the end-clients. Such communication can be achieved by any protocol, such as by a web-service, or by any combination of the above. The server or device that is used to decide whether a certain end-client will be presented with a CAPTCHA will be referred to hereinafter as the "Service Machine" and the service provided by the Service Machine is referred to hereinafter as "Conditional CAPTCHA Removal."

Accordingly, turning to FIG. 2, there is provided a flow diagram 80 in accordance with an exemplary embodiment of the present technique. Thus, when a CAPTCHA is presented to an end-client on a website in which Conditional CAPTCHA Removal is integrated, the Service Machine will check for the existence of a user identifier (hereinafter "user tag") on the end-client device. Such user tag will be searched, via client-side script served to the end-client, in a browser cookie, browser local storage, Flash cookie (known as "global storage") and cached JavaScript page to determine whether a user-tag cookie exists, at decision block 82.

If a user tag cookie is present and returned to the Service Machine, the process moves to decision block 84 where the Service Machine looks up the endclient device in a Service Machine (SM) database. If the end client device is listed in the SM database, the process continues to step 86 to obtain the user tag history from the SM database. If additional end-client device details are present in the SM database (such as device fingerprints, as described below), the Service Machine may compare some or all of the current end-client device attributes to the attributes saved with the user tag rule set in the SM database, to verify that the user tag cookie has not been stolen, at step 88.

If the end client is suspected of being a spammer, at decision block 90, the CAPTCHA challenge is presented, at step 92. Otherwise, if the end client attributes are in order, the process continues to step 94 where the CAPTCHA challenge is removed for this particular end client. If the SM database search determines that the end-client device is an unknown device, that is, the end-client device either (i) has no user tag or (ii) has a user tag which cannot be found or validated, the Service Machine will assign a unique user tag to the end-client device and place the unique user tag on the endclient device via a cookie, at step 96.

As understood in the relevant art, a cookie can be a standard browser cookie, a browser local storage, a flash cookie (global storage), or a cached JavaScript file which contains the user tag. The Service Machine may as well collect attributes from the end-client device, at step 98, assisted by client-side code. Such details, broadly known as "device fingerprint", may include, without wishing to be limited, browser type and version, OS type and version, browser build, JavaScript build, existing fonts, http headers, available browser plug-ins and their versions, browser add-ons (such as Acrobat Reader, Skype and others). These attributes will be stored with the newly created user-tag, for multiple purposes, such as: (i) verifying that a returning tag belongs to the end client and has not been stolen (as described above), or (ii) recognizing returning client devices which remove cookies and cache.

In an exemplary embodiment, when a CAPTCHA is presented to an end client on a web site in which Conditional CAPTCHA Removal is integrated, whenever a challenge is initiated, the Service Machine will be notified (typically via webservice) and will store the event with the user tag. Whenever the user inputs to the challenge are submitted, the Service Machine, will obtain and store the analysis of the CAPTCHA challenge.

Such analysis is typically conducted by any CAPTCHA software or service by comparing the CAPTCHA string to the client input and determining whether or not the CAPTCHA test was successful. Advanced CAPTCHA services may also detect signs of attempts to bypass a CAPTCHA test, typically by OCR automation or third party human solvers (known as "CAPTCHA relay"). These services may include alternatives beyond the binary success or failure.

Ultimately, the CAPTCHA server service will obtain, either from the CAPTCHA software or from the web application where the CAPTCHA challenge was presented, a message stating whether or not the CAPTCHA string was entered correctly, or whether the CAPTCHA challenge had been automated or relayed. This analysis result will be stored with the user-tag. The Service Machine will store the user tag and the analysis result. In addition, the Service Machine may obtain and store details such as the collected device attributes, the CAPTCHA's URL, the site name and a timestamp.

Subsequently, when the Service Machine is queried by a web application, and asked whether to show or remove a CAPTCHA challenge for an identified end client who has a user-tag, the Service Machine will look up the respective user tag in the SM database to determine whether an end client history rule has been configured, at decision block 100. The Service Machine may also collect additional end-client device attributes, as described above, in order to compare all or some of the attributes to the ones collected with the first record saved when assigning the original user tag to the identified end client. If a match is found, the Service Machine will retrieve the end-client device history rule set and apply rules on the history, at step 102, by which it will ultimately respond whether to show or remove a CAPTCHA challenge to the identified end client.

As disclosed in the present invention, the information used to conclude if a CAPTCHA should be displayed to an end client with a recorded history are preferably based on the following data items in a user's history: (i) the condition analysis results of the previous CAPTCHA test; (ii) the ratio between successful and failed CAPTCHA tests in the end client's history, or in a recent history interval (such as the ratio in last attempts or last hours/days); (iii) the amount of CAPTCHAs encountered by the end client during recent time intervals, such as the last 10 seconds, the last minute, the last hour, etc., and the results of the encounters (i.e., whether CAPTCHAs were actually displayed or hidden by the Conditional CAPTCHA Removal); and, (iv) the presence of "convictions" of automation or relay.

In addition, there are provided rules in a rule set to conclude if a CAPTCHA should be displayed to an end client with a recorded history. These rules include the following: (i) if the previously displayed CAPTCHA string was not entered at all or was not entered correctly, a CAPTCHA should be displayed; (ii) if the previously displayed CAPTCHA string was entered correctly, a new CAPTCHA should be displayed only in the following cases: (a) if a certain threshold of CAPTCHA challenges per given time interval was exceeded (e.g., more than one CAPTCHA challenge in the last 10 seconds), or (b) if the ratio between failed CAPTCHA tests and successful ones in the whole history or recent history limited to number of tests or time, surpasses a pre-defined threshold (for example, seven failed tests out ten most recent challenges would be a historical ratio surpassing a predefined value of five failed tests per ten challenges), or (c) if there were found convictions of form automation or CAPTCHA relay in the user's history, or (d) a recent portion of convictions surpassing a certain threshold (for example, two automation reports in one day surpassing a threshold of one, or (e) one relay report in the end client's history, surpassing the threshold of zero).

In an exemplary embodiment, the Service Machine includes the code or other means to connect to third parties which retain the end client's history, typically via API offered by those third parties. Such third parties may be entities, who place cookies on many users' machines on many different websites (known as "third party cookies"), and log users' visits and actions for their needs, such as, and without wishing to be limited, ad targeting. These third parties may track end clients and collect their visible history for purposes such as analyzing users' habits to help advertisers and/or publishers decide which ads are most suitable for each user. As can be appreciated by one skilled in the art, it is possible to determine if a certain end client has been tracked by such a service, and whether the end user has a recorded history as a consequence. This determination may be made via the API, or other communication methods provided by these providers to get the information they offer.

The Service Machine will, thus, include the code or means to get information about a certain end user device or browser from these third parties and, based on the information, establish if the end client has a recorded Internet usage history rule set and, if possible, how long this history is, at decision block 104. It can be assumed that automated agents have no third party cookies and no history rule set, or at least not any history longer than a few days, since they delete cookies, cache and any browsing history in order to maintain full anonymity. The third party user history check will be applied to unknown devices (without tag cookie or unknown tag), and its results will be saved into a database or a storage, with the newly assigned user tag.

In addition, popular websites which log an end client's data and identity may be queried as well, via API or any other means provided or available, to establish if the end client has an account over those website and, to the extent possible, how veteran the account is and when it was used. Such third party websites can be, without wishing to be limited, social networks, web mail platforms, general login suppliers such as the openID project, and others. Having accounts on those websites and the actual usage of the account may indicate a valid human client taking an active role on other popular websites, and not deleting cookies and cache. These third party user history checks are applied to unknown devices (without tag cookie or unknown tag), and their results are saved into an SM database or a storage, with the newly assigned user tag.

Some third party sites, such as social networks or other platforms, may require a user's consent to transmit data to the Service Machine. Such consent may be provided by embedding a script or a portion of a page (known as "widget" and also known on Facebook as "facebook application") from the third party site, or redirecting the user to the third party site on a specific page, such as an application page or a fan page created for the purpose of authoring the Conditional CAPTCHA Removal service. On each of these alternatives, the end client should be logged in to the third party site and, by clicking a certain checkbox or any required buttons, should confirm revealing details or exposing the personal account to the Service Machine. In such cases, the Conditional CAPTCHA Removal server may include the code required to walk the user through the process of confirming the CAPTCHA service.

In an exemplary embodiment, the present invention may include a well known browser exploit, known as "CSS exploit," in which links to websites are served to the browser with a script that checks the links' color attribute. Browsers apply different colors to new links and visited links, thus it can be learned if a user visited certain web addresses by their color. Along with the CAPTCHA, the page or code server by the Service Machine may include links to top popular websites or images on these websites, to see if they have been visited or not, utilizing the CSS exploit. Visits to those websites may also serve as a hint that the end client is human and is not hiding the browsing history.

An alternative to this exploit, which is already blocked by some browsers, can be to embed popular images (such as popular websites logos URLs) in the web page and measure, via client side script containing a timer and an onLoad event, their loading time. This can be used to determine whether the popular images are loaded from the local cache (which will normally take a few milliseconds) or from the Internet, a cache being an indication that the website has been visited. These browsing history checks are applied to unknown end client devices (without tag cookie or unknown tag), and their results are saved into a database or a storage, with the newly assigned user tag.

When the Service Machine is queried by a web application, and asked whether to show or remove a CAPTCHA challenge for a certain user who has no user-tag, or has a user-tag that cannot be validated on the SM database, the Service Machine will either (i) respond that a CAPTCHA challenge should be displayed, or, (ii) if the Conditional CAPTCHA Removal is configured differently, either globally or per certain website, the Service Machine will use some or all of the following information to conclude if a CAPTCHA should be displayed to an end client: (a) the end client's history with third party cookie trackers, (b) the end client's account availability, (c) usage on third party web platforms, such as social networks, identity platforms or web-mail platforms, and (d) the end client's browsing history in popular websites, such as obtained via CSS exploit or cached images.

In an exemplary embodiment, when the Service Machine is queried by a web application, at decision block 104, and asked whether to show or remove a CAPTCHA challenge for a certain end client who has no user-tag, or has a usertag that cannot be validated on the SM database, the Service Machine will apply rules to decide that a CAPTCHA challenge should be displayed because the user does not have not valid history, at step 92, or that the CAPTCHA challenge should not be displayed because the user does have a valid history, at step 94.

Such rules may be set such that: (i) if an end client has visited a predefined number of popular websites, or (ii) if an end client has a tracked history with third party cookie trackers, or (iii) this tracked history is longer than a predefined number of days, or (iv) if an end client has accounts on popular web platforms, or (v) if the end client has been using the account recently, or (vi) any combination of these, it will be presumed that the end client is a valid user who has a visible Internet browsing history and is not likely to be a spammer. If any of these conditions (i) through (vi) are met, or a predefined combination of them, the Service Machine will signal that a CAPTCHA challenge should not be displayed.

Figure 3:
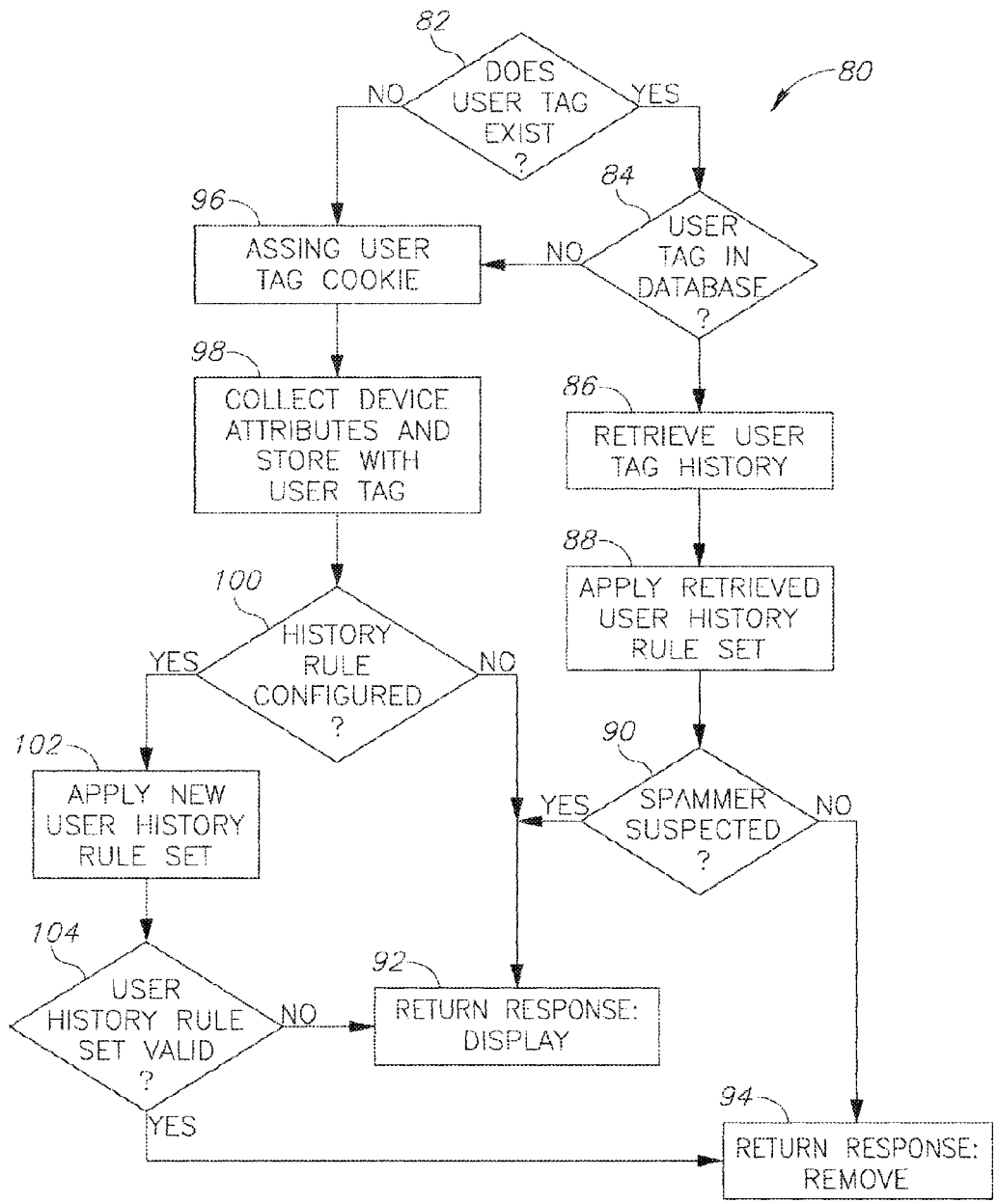
FIG. 3 is a flow diagram, in accordance with an aspect of the present invention.
Figure 4:
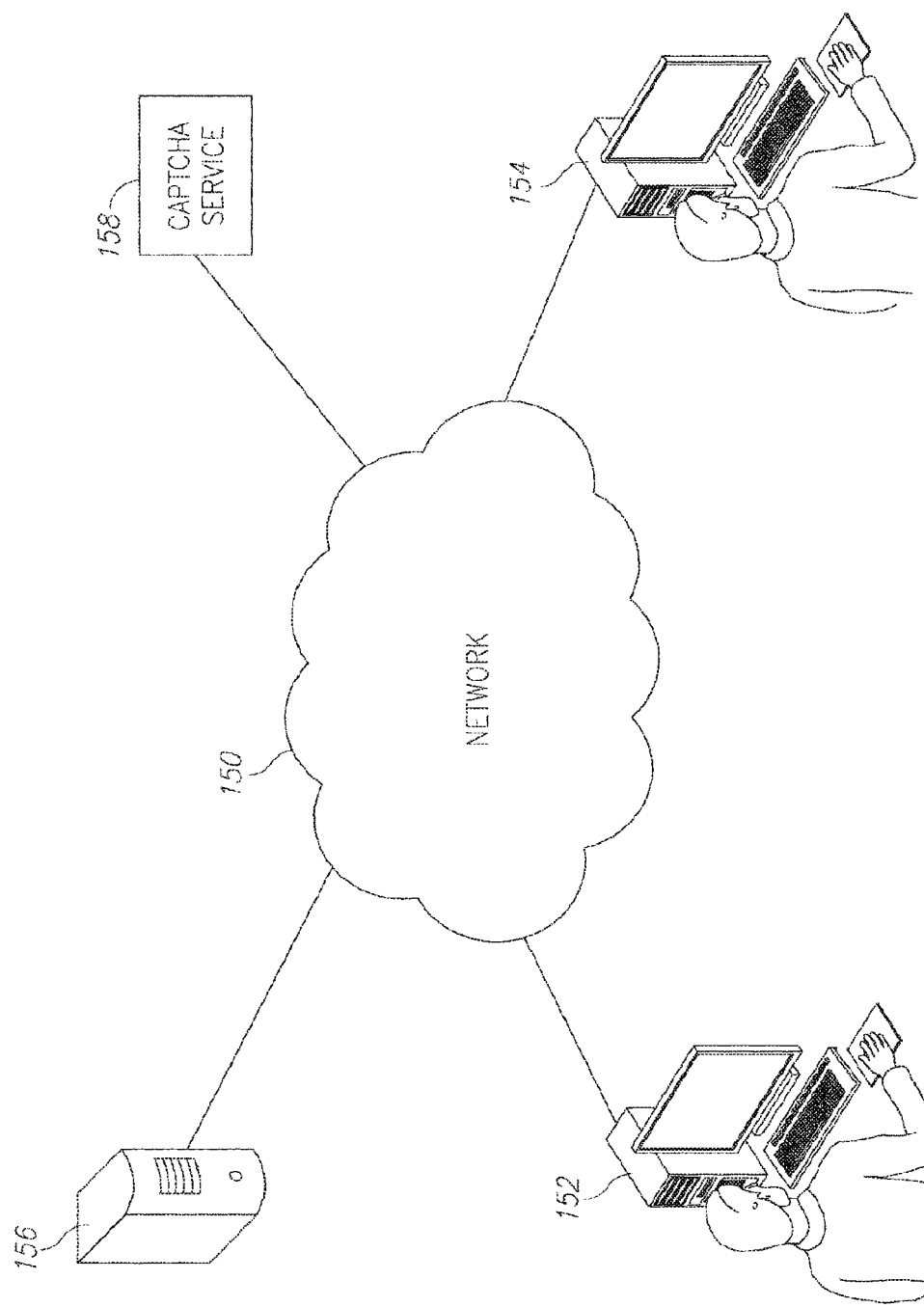
FIG. 4 is a network system in accordance with an exemplary embodiment of the present invention.

FIG. 4 illustrates a network 150, in accordance with an exemplary embodiment of the present technique. The network 150 is an exemplary embodiment of a platform on which a CAPTHA service is provided and/or processed as, described above with reference to FIGS. 1-3. Accordingly, network 150 is a communications network adapted for connecting various nodes, such as servers, computer systems and end users, as well as for facilitating the transfer of data between the nodes and end users. Further, the network 150 may be formed of various dedicated computer system and/or servers, some of which may be functioning as a computer cluster and/or computing cloud for providing and distributing CAPTCHA services in accordance with exemplary embodiments of the present technique.

More specifically, FIG. 4 illustrates, nodes/endpoints/end users 152 and 154, as well as, servers 156, and computing system (CS) 158. The user 152 and/or 154 may be client computers such as a home or office personal computer (PC), a remote client, a thin client or other type of computer and/or processing interface adapted for general data processing and for connecting to the network 150. Although not illustrated by FIG. 1, the client computers may further be coupled and/or connected to other peripheral devices, such as monitors, keyboards, mice, printers, routers, wireless devices, microphones, speakers, cameras, finger print identifiers, external memory devices, and other devices. The PC 12 may include software platforms and operating systems, such Windows, Linux—Red Hat, and other supporting programs.

It should be borne in mind that although the present invention is described with regard to a "computer" on a "computer network", it should be noted that the term "computer" may comprise any device featuring a data processor and/or the ability to execute one or more instructions. Such device may include, but not be limited to: a personal computer (PC), a server, a minicomputer, a cellular telephone, a smart phone, a personal data assistant (PDA), a pager, a TV decoder, a game console, a digital music player, an automated teller machine (ATM), a point of sale (POS) credit card terminal, or an electronic cash register. Any two or more of such devices in communication with each other, and/or any computer in communication with any other computer may optionally comprise a "computer network."

Thus, users, i.e., users 152 and 154 having access to the network 10 may be provided with webpages as part of any general browsing or searching of the network 150. It should be borne in mind that the network 150 may be accessed by a plurality of users, such as the users 152 and 154, formed of various segments, locations, preferences, and/or other attributes characterizing the personal make up of the network users.

Further, server 156 and/or CS 158 may be adapted for storing, routing and/or communicating data within the network 150 and/or other networks to which the server 156 and CS 18 may be connected. Thus, the server 156 may store information related to material included as part of vendor website, such as those belonging to certain vendors advertisers, promoters, administrators and so forth. Alternatively, the server 156 may store originally created ads, as well as parameters specifying the manner by which personalized should be rendered.

Further, in an exemplary embodiment, the server 156 may be of the type available by Sun Microsystems, Hewlett Packard, Dell, International Business Machines (IBM), and/or other known server vendors and providers. Accordingly, the server 156 and the CS 158 may include various hardware devices, such as microprocessors, memory cards, graphic cards, routers, wireless devices and other modules for receiving, transmitting and/or processing data. In addition, the servers may include various software platforms and packages, such as those providing code written in Java, Python, Ruby on Rails, and/or other computer languages, for facilitating the everyday operation and use of the server 154 and CS 158 as part of the network 150. It should further be borne in mind that the user nodes 152 and 154 and the servers 156 and CS 158 are exemplary, and that the network 150 may include many other additional user nodes similar to the users 152 and 154, as well as, multiple other servers similar to those discussed herein.

Further, the server 156 may be adapted to store data, such as websites, generally accessible to the user 152 and/or 154 via the network 150. Those skilled in the art will appreciate that each website accessible, for example, to the user may contain multiple web pages which may also be accessible to the users 152 and 154 upon request. For example, the server 14 may store websites of private companies and/or corporations, as well as government and/or other pubic organizations. Hence, the server 154 provides access to the user 12 of web pages provided by the above mentioned private or public entities so that the user, for example, can conduct business and/or manage various tasks through the network 150. For instance, the user 152 may access the server 154 for downloading a webpage belonging to a vendor through which the user 12 may perform financial transactions such as when purchasing consumer items or the like. By further example, the user 152 may access the server 14 for downloading webpages, such as those associated with various public institutions, through which the users 152 and 154 can provide personal and/or other type of information for conducting everyday personal and/or work-related business and so forth. Accordingly, the users 152 and 154 may generally form communication sessions during which the user 152 and server 154 exchange information through the network 150.

In accordance with exemplary embodiments of the present technique, a CAPTCHA session can be initiated the CS 158, where a Service Machine may be implemented. The Service Machine is adapted to return a transaction ID and a code to the web server 156 or web application. Accordingly, the web server 156 or web application outputs script to the user 152/154. The end 154/156 user receives the script for creating an Iframe. The Service Machine (e.g., CS 158) receives a transmission from the end user 152/154 and gets a user tag or applies a user tag, at step 20. The Service Machine is further adapted to obtain the attributes of the user device 152/154 to generate images and code.

As explained above with the reference with reference to FIGS. 1 and 2, the CS 158 is adapted to send the CAPTCHA code to the end user 152/154. The end user obtains the CAPTCHA code, and requests a CAPTCHA image. The CS 158 receives the user request and sends the CAPTCHA image to the end user 152/154. Accordingly, the end user device displays a partial image, logs events, and submits the form to the web server 1560*r* web application. The web server 156 or web application obtains the form inputs, including the CAPTCHA fields. The web server 156 or web application then queries the CS 158 to validate the CAPTCHA.

Further, the CS 158 obtains the CAPTCHA and the user device (e.g., users 152/154) events. The CS then generates a user input analysis, a user device event analysis, user device history analysis. The resulting CAPTCHA test results and alerts are returned to the end user device 152/154 by the CS 158. The end user device receives the CAPTCHA test results and alerts from the CS 158.

In other exemplary embodiment of the present technique, the network system 150 is adapted for implementing a method of selectively challenging a user 152/154 with an automated public Turing test to the user 152/154 in response to a communication from the user 152/154. Accordingly, when the user 152/154 accesses a website, such as one made available by the server 156, the CS 158 is adapted to check for the existence of a user identifier. If the CS 158 is provided with an identifier of the user 152/154, the CS 158 verifies that said returned user identifier is a genuine and is not a stolen identifier. Further, if the user identifier is not returned, the CS 158 assigns a user identifier to the user. Thereafter, the CS 158 presents the automated public Turing test to the user unless predetermined criteria, such as those relating the user 152/154 attribute and history, as set forth above with reference to FIG. 3. Further, the CS 158 is adapted to obtain and store an analysis of the response of the user to the automated public Turing test.

Unless otherwise defined, all technical and scientific terms used herein have the same meaning as commonly understood by one of ordinary skill in the art to which this invention belongs. The materials, methods, and examples provided herein are illustrative only and not intended to be limiting.

Many of the specific details of certain embodiments of the invention are set forth in the above description and related drawings to provide a thorough understanding of such embodiments. One skilled in the art will understand, however, that the present invention may be practiced without several of the details described in the above description. Moreover, in the description, it is understood that the figures related to the various embodiments are not to be interpreted as conveying any specific or relative physical dimension.

The invention claimed is:

1. A computer-implemented method of administering a CAPTCHA challenge and detecting the usage of a CAPTCHA bot or relay by a client computer, comprising, by a server device:
    providing a CAPTCHA challenge to the client computer, the CAPTCHA challenge comprising an image and browser code for displaying the image, the image comprising a character string in which a first substring smaller than said character string corresponds to a solution to the CAPTCHA challenge and at least one second substring smaller than said character string corresponds to extra characters not part of the solution,
    responsive to the browser code, displaying the image on the client computer wherein only the first substring is visible in the browser and the at least one second substring is hidden in the browser,
    receiving a response from the client computer indicative of a solution to the CAPTCHA challenge,
    comparing the response with the at least one second substring, and
    determining, if the response includes the first substring and the at least one second substring, that the client computer used a CAPTCHA bot or relay.

2. The method of claim 1 wherein said CAPTCHA challenge comprises animation capability such that at any given time a varying portion of the first substring is hidden from view on the display on the client computer.

3. The method of claim 1, further comprising evaluating at least one of: a number of form element focus events performed by the client computer, a number of mouse events performed by the client computer, and a number of keyboard events performed by the client computer.

4. The method of claim 1, further comprising comparing the client computer's IP address with an IP address associated with said response.

5. The method of claim 1, further comprising determining whether an iFrame exists on the client computer, and if so, determining the URL of said iFrame; and verifying the URL associated with a parent document of said iFrame.

6. A system for administering a CAPTCHA challenge and detecting the usage of a CAPTCHA bot or relay by a client computer, comprising a server device configured to perform a method comprising the steps of:
    providing a CAPTCHA challenge to the client computer, the CAPTCHA challenge comprising an image and browser code for displaying the image, the image comprising a character string in which a first substring smaller than said character string corresponds to a solution to the CAPTCHA challenge and at least one second substring smaller than said character string corresponds to extra characters not part of the solution,
    responsive to the browser code, displaying the image on the client computer wherein only the first substring is visible in the browser and the at least one second substring is hidden in the browser,
    receiving a response from the client computer indicative of a solution to the CAPTCHA challenge,
    comparing the response with the at least one second substring, and
    determining, if the response includes the first substring and the at least one second substring, that the client computer used a CAPTCHA bot or relay.

7. The system of claim 6, wherein said CAPTCHA challenge comprises animation capability such that at any given time a varying portion of the first substring is hidden from view on the display on the client computer.

8. The system of claim 6, further comprising evaluating at least one of: a number of form element focus events performed by the client computer, a number of mouse events performed by the client computer, and a number of keyboard events performed by the client computer.

9. A computer program product for administering a CAPTCHA challenge and detecting the usage of a CAPTCHA bot or relay by a client computer comprising a non-transitory computer readable storage medium having computer readable program embodied therewith, the computer readable program comprising code for implementing a method comprising the steps of:
    providing a CAPTCHA challenge to the client computer, the CAPTCHA challenge comprising an image and browser code for displaying the image, the image comprising a character string in which a first substring smaller than said character string corresponds to a solution to the CAPTCHA challenge and at least one second substring smaller than said character string corresponds to extra characters not part of the solution,
    responsive to the browser code, displaying the image on the client computer wherein only the first substring is visible in the browser and the at least one second substring is hidden in the browser,
    receiving a response from the client computer indicative of a solution to the CAPTCHA challenge,
    comparing the response with the at least one second substring, and
    determining, if the response includes the first substring and the at least one second substring, that the client computer used a CAPTCHA bot or relay.

10. The computer program product of claim 9, wherein said CAPTCHA challenge comprises animation capability such that at any given time a varying portion of the first substring is hidden from view on the display on the client computer.

11. The computer program product of claim 9, further comprising evaluating at least one of: a number of form element focus events performed by the client computer, a number of mouse events performed by the client computer, and a number of keyboard events performed by the client computer.

* * * * *